US009776519B2

(12) United States Patent
Chander et al.

(10) Patent No.: US 9,776,519 B2
(45) Date of Patent: Oct. 3, 2017

(54) SYSTEM AND METHOD FOR CONTROLLING ELECTRIC POWER IN A PLUG-IN VEHICLE FROM AN EXTERNAL POWER SOURCE

(75) Inventors: Bala S. Chander, Canton, MI (US); Allan Roy Gale, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2051 days.

(21) Appl. No.: 12/543,051

(22) Filed: Aug. 18, 2009

(65) Prior Publication Data

US 2011/0046828 A1    Feb. 24, 2011

(51) Int. Cl.
*H02J 7/00* (2006.01)
*B60L 11/18* (2006.01)
(Continued)

(52) U.S. Cl.
CPC ........... *B60L 11/1816* (2013.01); *B60L 1/003* (2013.01); *B60L 1/02* (2013.01); *B60L 11/123* (2013.01); *B60L 11/14* (2013.01); *B60L 11/1868* (2013.01); *H02J 7/00* (2013.01); *H02J 7/0003* (2013.01); *H02J 7/0013* (2013.01);
(Continued)

(58) Field of Classification Search
USPC ....... 320/109, 132, 152, 157, 158, 159, 162, 320/163, 164, 103–105; 307/10.7, 43–48, 307/64–66; 361/78, 79, 87, 93.1, 93.9, 361/94, 95, 96, 97, 98, 99; 180/65.1, 180/65.21, 65.29
See application file for complete search history.

(56) References Cited

U.S. PATENT DOCUMENTS 3,763,415 A * 10/1973 Ownby ................. H02J 7/1423
307/10.1
4,293,759 A    10/1981 Higgins
(Continued)

FOREIGN PATENT DOCUMENTS

CN          101446239 A    6/2009
WO    WO 2009068964 A1 *  6/2009 ............ B60W 20/00

OTHER PUBLICATIONS

"Chevy Volt Forum-What Features You Would Like in the Volt", GM-VOLT: Chevy Volt Concept Site, http://www.gm-volt.com/volt-discussion?forum=1&topic-1&page=1, blogs between the dates of Mar. 31, 2007-Apr. 23, 2007, 6 pages.
(Continued)

Primary Examiner — Tien Dinh
Assistant Examiner — Michael A Fabula
(74) Attorney, Agent, or Firm — David Kelley; Brooks Kushman P.C.

(57) ABSTRACT

A system and method is provided for controlling electric power in a plug-in vehicle, such as a pure electric vehicle or hybrid electric vehicle. The electric power is controlled from an external power source to one or more predetermined components in the plug-in vehicle. The power source is external to the vehicle and has a maximum power level. Electric power at a charging level from the external power source is received. Based on the charging level and the maximum power level, an available power level is determined. Based on the available power level, the electric power is controlled from the external power source to the predetermined components in the plug-in vehicle.

20 Claims, 2 Drawing Sheets

(51) Int. Cl.
   *B60L 1/00*     (2006.01)
   *B60L 1/02*     (2006.01)
   *B60L 11/12*    (2006.01)
   *B60L 11/14*    (2006.01)

(52) U.S. Cl.
   CPC ..... *B60L 2210/20* (2013.01); *B60L 2240/545* (2013.01); *B60L 2240/622* (2013.01); *B60L 2240/662* (2013.01); *B60L 2240/667* (2013.01); *B60L 2250/14* (2013.01); *B60L 2260/56* (2013.01); *Y02T 10/6217* (2013.01); *Y02T 10/7005* (2013.01); *Y02T 10/7066* (2013.01); *Y02T 10/7072* (2013.01); *Y02T 10/7077* (2013.01); *Y02T 10/725* (2013.01); *Y02T 10/7291* (2013.01); *Y02T 90/127* (2013.01); *Y02T 90/14* (2013.01); *Y02T 90/16* (2013.01); *Y02T 90/162* (2013.01)

(56) References Cited

U.S. PATENT DOCUMENTS

| | | | |
|---|---|---|---|
| 4,350,287 A | 9/1982 | Richards | |
| 4,547,678 A * | 10/1985 | Metzner et al. | 290/40 C |
| 5,305,613 A * | 4/1994 | Hotta et al. | 62/209 |
| 5,467,006 A * | 11/1995 | Sims | 237/5 |
| 5,483,807 A | 1/1996 | Abersfelder et al. | |
| 5,488,283 A * | 1/1996 | Dougherty | B60L 11/1855 307/10.1 |
| 5,586,448 A * | 12/1996 | Ikeda et al. | 62/156 |
| 5,595,064 A * | 1/1997 | Ikeda et al. | 62/126 |
| 5,656,916 A * | 8/1997 | Hotta | 320/160 |
| 5,696,436 A * | 12/1997 | Kim et al. | 320/160 |
| 5,791,407 A | 8/1998 | Hammons | |
| 6,886,352 B2 | 5/2005 | Yoshinori et al. | |
| 7,055,340 B2 | 6/2006 | Umebayashi et al. | |
| 7,256,516 B2 * | 8/2007 | Buchanan et al. | 307/62 |
| 7,572,055 B2 * | 8/2009 | Kubota et al. | 374/142 |
| 7,622,897 B2 * | 11/2009 | Eberhard et al. | 320/150 |
| 7,698,078 B2 * | 4/2010 | Kelty et al. | 702/63 |
| 7,849,944 B2 * | 12/2010 | DeVault | 180/65.29 |
| 8,049,460 B2 * | 11/2011 | Krauer et al. | 320/104 |
| 8,125,181 B2 * | 2/2012 | Gregg et al. | 320/104 |
| 8,154,244 B1 * | 4/2012 | Gorham et al. | 320/103 |
| 2003/0158638 A1 * | 8/2003 | Yakes et al. | 701/22 |
| 2004/0130288 A1 * | 7/2004 | Souther et al. | 320/104 |
| 2004/0169489 A1 * | 9/2004 | Hobbs | 320/104 |
| 2006/0232238 A1 * | 10/2006 | Horii | B60K 6/28 320/104 |
| 2008/0059035 A1 * | 3/2008 | Siddiqui et al. | 701/93 |
| 2009/0016405 A1 * | 1/2009 | Kubota et al. | 374/142 |
| 2009/0021221 A1 * | 1/2009 | Krauer et al. | 320/153 |
| 2009/0143922 A1 * | 6/2009 | Juricak | B60W 10/30 701/1 |
| 2009/0143929 A1 * | 6/2009 | Eberhard et al. | 701/22 |
| 2010/0072954 A1 * | 3/2010 | Kohn et al. | 320/152 |
| 2010/0097036 A1 * | 4/2010 | Wakayama | 320/153 |
| 2010/0156355 A1 * | 6/2010 | Bauerle et al. | 320/145 |
| 2010/0206957 A1 * | 8/2010 | Vyas et al. | 236/46 R |
| 2010/0289451 A1 * | 11/2010 | Tuffner et al. | 320/109 |
| 2010/0318250 A1 * | 12/2010 | Mitsutani | 701/22 |
| 2011/0012553 A1 * | 1/2011 | Sloan et al. | 320/105 |
| 2011/0029146 A1 * | 2/2011 | Muller et al. | 700/293 |
| 2011/0043165 A1 * | 2/2011 | Kinser et al. | 320/109 |
| 2011/0089758 A1 * | 4/2011 | Kinser et al. | 307/10.1 |
| 2011/0144823 A1 * | 6/2011 | Muller et al. | 700/297 |
| 2011/0267004 A1 * | 11/2011 | Krauer | B60L 11/1875 320/109 |
| 2012/0038326 A1 * | 2/2012 | Endo et al. | 320/162 |
| 2012/0109407 A1 * | 5/2012 | Yousefi et al. | 701/1 |
| 2013/0069798 A1 * | 3/2013 | Jones et al. | 340/905 |

OTHER PUBLICATIONS

"Chevy Volt Forum—What Features You Would Like in the Volt.", GM-VOLT: Chevy Volt Concept Site, http://www.gm-volt.com/volt-discussion?forum=1&topic=1&page=2, blogs between the dates of Apr. 24, 2007-Jun. 21, 2007, 9 pages.

Chinese Patent Office, Fourth Office Action for the corresponding Chinese Patent Application No. 201010255152.8 mailed Jul. 8, 2015.

* cited by examiner

SYSTEM AND METHOD FOR CONTROLLING ELECTRIC POWER IN A PLUG-IN VEHICLE FROM AN EXTERNAL POWER SOURCE

BACKGROUND

1. Technical Field

System and method for controlling electric power in a plug-in vehicle from an external power source to one or more components in the vehicle.

2. Background Art

A plug-in vehicle is a vehicle that can connect to an electric power source and receive electric power from the power source. The electric power received can be stored or used to operate a number of devices in the vehicle. The plug-in vehicle is typically plugged into a household outlet to charge a battery in the plug-in vehicle.

SUMMARY

A system and method for controlling electric power in a plug-in vehicle is provided. The electric power is controlled from an external power source to one or more predetermined components in the vehicle. The external power source is external to the vehicle and has a maximum power level.

The system includes a battery and a controller that are in the vehicle. The battery receives electric power at a charging level from the external power source and the controller determines an available power level. The controller determines the available power level based on the charging level and the maximum power level. Based on the available power level, the controller distributes the electric power from the external power source to the predetermined components in the vehicle. In addition, the controller may schedule or prioritize the predetermined components to receive the electric power from the external power source to the predetermined components.

The method includes receiving electric power at a charging level from the external power source. The method also includes determining an available power level based on the charging level and the maximum power available from the external power source. Based on the available power level, the electric power is controlled from the external power source to the predetermined components in the vehicle. Furthermore, the method may include prioritizing and/or scheduling the predetermined components to distribute the electric power from the external power source to at least one of the predetermined components.

DETAILED DESCRIPTION

Embodiments of the present invention generally provide a system and method for controlling electric power in a plug-in vehicle from an external power source to one or more predetermined components in the vehicle, such as a vehicle climate control system, when charging one or more storage batteries at a power level that is below the maximum power level available from the power source. Electric power is controlled when the vehicle is stationary and connected to the external power source. For example, the external power source can be a standard household power outlet. In operation, the electric power is controlled based on an available power level that can be delivered from the external power source. The available power level is determined based on a maximum power level of the external power source and a charging level that the vehicle receives to charge the storage battery or other storage medium of electric power.

Figure 1:
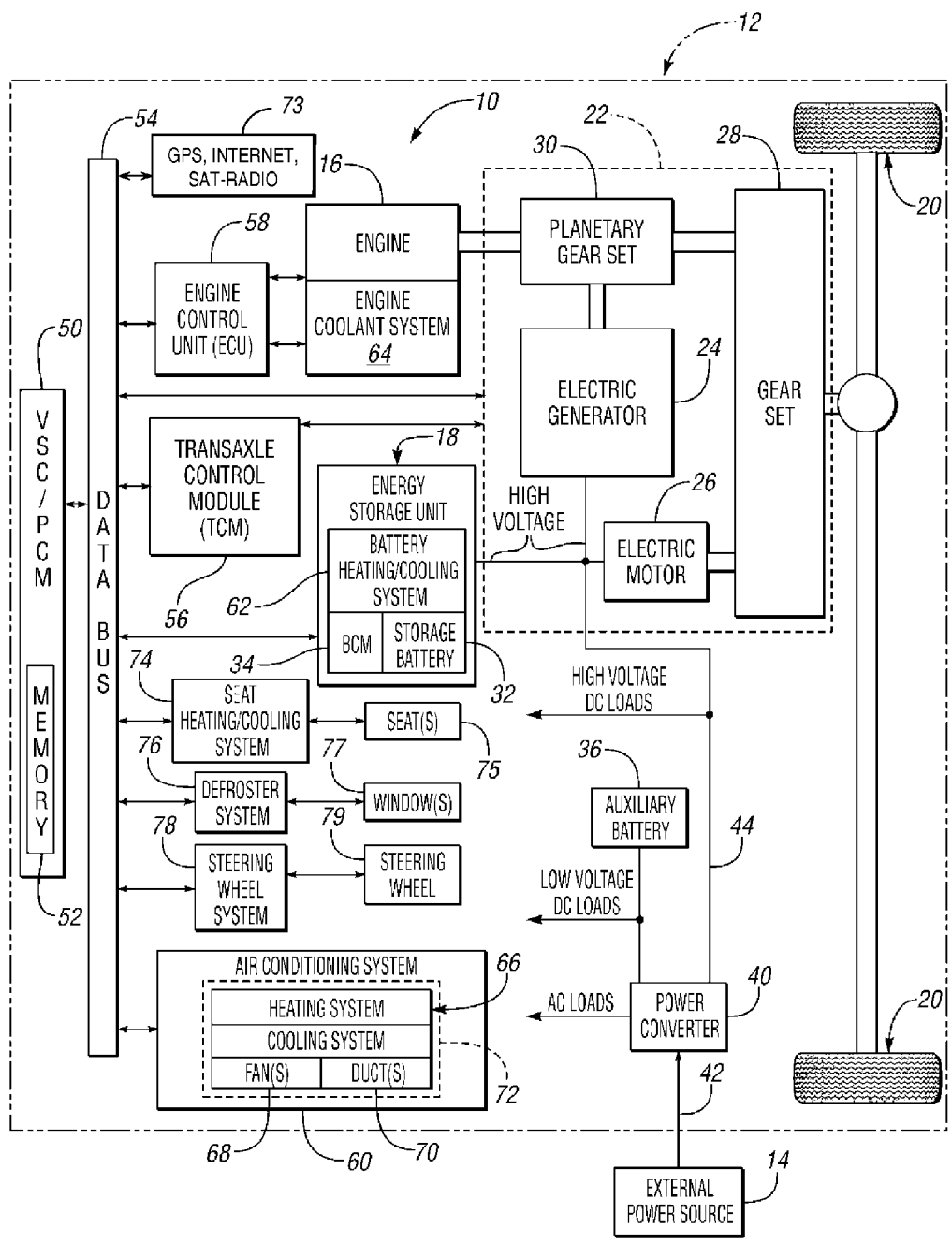
FIG. 1 is a schematic diagram illustrating a plug-in vehicle including a system for controlling electric power from an external power source to one or more predetermined components in the vehicle.

With reference to FIG. 1, a system 10 is provided for controlling electric power in a plug-in vehicle 12 from an electric power source 14 to one or more predetermined components in the vehicle 12. The electric power source 14 (hereinafter "external power source") is external to the vehicle 12. It should be understood that the term "plug-in vehicle" includes any type of automotive vehicle that can connect to the external power source 14 to receive electric power from the external power source 14. The system 10 and its method of operation are described in an integrated manner to facilitate understanding of various aspects of the present invention.

The external power source 14 provides power to the system 10 in the vehicle 12. While the external power source 14 is described as an AC power source, the external power source 14 may be a DC power source. The power source may be any suitable power source, such as a 120-volt AC outlet or a 300-volt DC outlet. Furthermore, the AC power from the external power source 14 may be single-phase AC power. In addition, the external power source 14 may be part of a power distribution grid (hereinafter "GRID"). For example, the external power source 14 may be a standard household electrical outlet that is electrically connected to the GRID. The GRID steps down electric power from a high voltage, such as 7,200 volts, to a lower voltage, such as 240 volts.

In context of the system 10, the external power source 14 has a maximum power level of electric power that the external power source 14 can deliver to the vehicle 12. For example, the maximum power level may be 1,400 watts. The maximum power level of the external power source 14 may be calculated as the product of an AC line current limit, which is between the vehicle 12 and the external power source 14, and the voltage across the external power source 14. For example, if the AC line current limit is twelve amps, and the voltage across the power source 14 is 120 volts, then the AC line current limit is 1,440 watts. Those skilled in the art will recognize that determining or calculating the maximum power level provides an accurate measure if a power converter, such as the power converter 40, operates with a unity power factor regulation. If the power converter has a less than unity power factor, then determining or calculating the maximum power level may require the inclusion of an operating power factor.

The system 10 of FIG. 1 is shown integrated with a powertrain of a parallel/series hybrid electric vehicle (PSHEV). However, the system 10 can be integrated with any type of plug-in vehicle. For example, the vehicle 12 may be a pure electric vehicle, a series hybrid electric vehicle (SHEV), a parallel hybrid electric vehicle (PHEV), or a non-electric vehicle, such as an internal-combustion driven vehicle.

The vehicle 12 of FIG. 1 includes an engine 16, a battery unit or energy storage unit 18, and drive wheels 20. The engine 16 and the energy storage unit 18 selectively provide power to the drive wheels 20 so that the vehicle 12 can be propelled. In addition, the vehicle 12 includes a transaxle 22, which is analogous to a transmission in a conventional vehicle. The transaxle 22 includes an electric generator 24, an electric motor 26, and a gear set 28, and a planetary gear set 30. The transaxle 22 is coupled between the drive wheels 20 and the engine 16 and the energy storage unit 18 to provide or to absorb electric power in the vehicle 12. For example, the energy storage unit 18 may provide electric power to control how and when power is transferred to the drive wheels 20.

As shown in FIG. 1, the planetary gear set 30 of the transaxle 22 mechanically couples the engine 16, the drive wheels 20, and the electric generator 24. For example, the electric generator 24 may be connected to a sun gear of the planetary gear set 30 while the engine 16 and the drive wheels 20 are respectively connected to the planetary carrier and the ring gear of the planetary gear set 30.

As illustrated in FIG. 1, the system 10 may include the energy storage unit 18. The energy storage unit 18 includes a high-voltage storage battery 32 and a battery control module 34 (hereinafter "BCM"). For example, the high-voltage battery may be at 300 volts. In operation, the storage battery 32 stores or outputs electric power to various components in the vehicle 12. For example, the storage battery 32 may output electric power to the electric motor 26, absorb power from the generator 24, or power other electric-based devices in the vehicle 12. Being a device that can store electric energy, the storage battery 32 has a state of charge (SOC). When the storage battery 32 is recharging from the external power source 14, the energy storage unit 18 receives electric power at the charging level from the external power source 14. As the storage battery 32 recharges, the SOC of the storage battery 32 increases.

The BCM 34 of the energy storage unit 18 controls the high-voltage storage battery 32. The BCM 34 can control the storage battery 32 to output electric power, store electric power from the external power source 14, or a combination of both. For example, the BCM 34 can control the charging level of the storage battery 32 to increase, to maintain, or to decrease the SOC of the storage battery 32.

As depicted in FIG. 1, the system 10 may include an auxiliary battery 36, such as a low-voltage storage battery. For example, the auxiliary battery may be a 12 volt battery. Like the high-voltage storage battery 32, the auxiliary battery 36 stores or outputs electric power to various components in the vehicle 12. For example, the auxiliary battery 36 may output electric power at 12 volts to various low-voltage loads that operate on DC power. Similarly, the auxiliary battery 36 has a state of charge (SOC). The auxiliary battery 36 may be charged from electric power that the external power source 14 provides to the system 10. The SOC of the auxiliary battery 36 increases as the auxiliary battery 36 receives electric power at a charging level from the external power source 14. The charging level of the system 10 may represent the charging level of the auxiliary battery 36, the charging level of the high-voltage storage battery 32, or the charging levels of both batteries 32, 36.

As illustrated in FIG. 1, the system 10 may include a charger or a power converter 40, which may include an AC/DC converter, a DC/DC converter, an AC/AC converter, or a combination thereof depending on the particular application or configuration of the system 10. The power converter 40 can charge the storage battery 32 as well as power other devices in the vehicle 12. In addition, the power converter 40 may charge the auxiliary battery 36. In operation, the power converter 40 receives power from the external power source 14 through electrical line 42 and converts the power to a more suitable form of power. For example, the power converter 40 may include a high-voltage AC/DC converter for high-voltage DC loads and the high-voltage storage battery 32, a low-voltage AC/DC converter for low voltage DC loads and the low-voltage storage battery 36, as well as an AC/AC converter for various AC loads in the vehicle 12. The high-voltage AC/DC converter converts AC power from the external power source 14 into high-voltage DC power that is more suitable for the high-voltage DC loads and storage battery 32. Similarly, the low-voltage AC/DC converter converts AC power from the external power source 14 into low-voltage DC power that is more suitable for the auxiliary battery 36 and the low-voltage DC loads.

Electrical line 42 may be any suitable conductor of electric energy that can electrically connect the vehicle 12 to the external power source 14, such as a cable or power cord. The storage battery 32 receives the DC power from the power converter 40 through electrical line 44, which may be a high-voltage bus.

As shown in FIG. 1, the system 10 includes a controller 50 or some other type of programmable logic device to control various components in the vehicle 12. The controller 50 of FIG. 1 is shown as a combination of a vehicle system controller (VSC) and a powertrain control module (PCM). The combination of the VSC and the PCM is hereinafter referenced as a "VSC/PCM" having reference numeral 50. Although the VSC/PCM 50 is shown as a single hardware device, the VSC/PCM 50 may include multiple controllers in the form of multiple hardware devices, or multiple software controllers within one or more hardware devices.

The system 10 may include a computer-readable storage medium 52 (hereinafter "memory") to store a computer program or algorithm embedded or encoded with the method. The memory 52 can be part of the VSC/PCM 50 as shown in FIG. 1. However, the memory 52 may be positioned in any suitable portion in the vehicle 12 accessible to the VSC/PCM 50. In addition to storing the computer program or algorithm, the memory 52 can store data or information about the various components in the vehicle 12 to implement the method.

As shown in FIG. 1, the VSC/PCM 50 controls the power converter 40, the transaxle 22, the engine 16, and the energy storage unit 18 through a vehicle data bus 54 (hereinafter "data bus"). The data bus 54 is in communication with various components in the vehicle 12 including the BCM 34, the power converter 40, and controllers for the transaxle 22 (e.g., a transaxle control module 56) and the engine 16 (e.g., an engine control unit 58). The data bus 54 may be implemented as a controller area network (CAN), a local interconnect network (LIN), or any such suitable data-communication link that can transfer data between the VSC/PCM 50 and other devices in the vehicle 12.

The system 10 can use the external power source 14 to power one or more predetermined components in the vehicle 12 to prepare for driver or occupant usage. For example, the system 10 can use the external power source 14 to heat and cool a passenger compartment in the vehicle 12 in an effort to increase driver comfort without decreasing the SOC of the storage battery 32 before the vehicle 12 is driven from one location to another.

In operation, the VSC/PCM 50 of the system 10 commands selected components, such as the heated/cooled seats, to turn on or turn off as desired. The power converter 40 and/or the desired components cause the distribution of the electric power from the external power source 14 to one or more components in the vehicle 12. The VSC/PCM 50 controls distribution of the electric power based on an available power level.

The available power level can indicate an amount of power that the external power source 14 is capable of providing in addition to the amount of power that the external power source 14 is currently providing. The VSC/PCM 50 can determine the available power level based on the charging level of the system 10 and the maximum power level of the external power source 14. Recall, the charging level of the system 10 may represent the charging level of the auxiliary battery 36, the charging level of the high-voltage storage battery 32, or the charging levels of both batteries 32, 36, depending on the particular configuration of the system 10. For example, the VSC/PCM 50 may calculate the available power level as the difference between the maximum power level of the external power source 14 and the charging level of the storage battery 32. In such an example, if the maximum power level is 1,400 watts and the charging level is 900 watts, then the available power level is about 500 watts.

The VSC/PCM 50 may be configured to schedule and/or prioritize the predetermined components to receive the electric power from the external power source 14. The VSC/PCM 50 schedules and/or prioritizes the predetermined components to obtain a schedule or a prioritization. The VSC/PCM 50 can obtain the schedule or the prioritization in real-time or based on a predetermined schedule stored in memory 52. Based on the schedule or the prioritization, the VSC/PCM 50, the BCM 34, the power converter 40, or a combination thereof can control distribution of the electric power from the external power source 14 to at least one of the predetermined components.

The electric power from the external power source 14 may be distributed in an effort to optimize or manage which of predetermined components receives the electric power from the external power source 14, when such electric power is distributed, and how much electric power each of the predetermined components receives. For example, the electric power from the external power source 14 may be distributed in an effort to optimize or manage charging of the storage battery 32 as one of the predetermined components in the vehicle 12 receives electric power from the external power source 14. Such allocation and distribution of the electric power from the external power source 14 prepares the storage battery 32 and other predetermined components in the vehicle 12 before the vehicle 12 is driven and without reducing the SOC of the storage battery 32.

As illustrated in FIG. 1, the predetermined components may include one or more of the following: the transaxle 22, the electric generator 24, the electric motor 26, the planetary gear set 30, the batteries 32, 36, an air conditioning system 60 in the vehicle 12, a battery heating/cooling system 62 that controls a temperature of the storage battery 32, an engine coolant system 64 that controls a temperature of "coolant" for the engine 16, and other components or systems in the vehicle 12 that use electric power to operate. The predetermined components may receive high-voltage DC power, low-voltage DC power, AC power, or a combination thereof from the external power source 14 to operate the predetermined components. Whether each predetermined component in the vehicle 12 receives high-voltage DC power, low-voltage DC power, AC power, or a combination thereof depends on design of the predetermined component.

As shown in FIG. 1, the air conditioning system 60 can include a heating system, a cooling system, or both a heating and cooling system (hereafter generally referenced with numeral 66) to selectively heat, cool, or heat and cool the passenger compartment in the vehicle 12. The system 10 may heat or cool the passenger compartment using electric power from the external power source 14 while allowing the storage battery 32, the auxiliary battery 36, or both to maintain or increase the SOC therein. This may be beneficial to a user who desires to either pre-heat or pre-cool the air in the passenger compartment prior to driving the vehicle 12. In addition, the air conditioning system 60 can include one or more fans 68 and ducts 70 to move air into the passenger compartment in the vehicle 12. For example, the air conditioning system 60 may be a heating, ventilating, and air conditioning (HVAC) system 72 or part of a HVAC system 72 in the vehicle 12. In addition, a user of the vehicle 12 may enter or input a programmed user preference for the air conditioning system 60. The programmed user preference may be a temperature value, a humidity value, a filtration value, or other passenger-compartment air parameter. For example, the temperature value may be seventy-one degrees Fahrenheit (i.e., 71° F.), the humidity value may be sixty percent, and the filtration value may be twenty parts-per-million (ppm). The air conditioning system 60 may access the programmed user preference from memory 52 to control the air conditioning system 60 in an effort to condition the air in the passenger compartment in the vehicle 12 according to the programmed user preference. For example, if the air in the passenger compartment has a temperature below the temperature value of the programmed user preference (e.g., 71° F.), then the air conditioning system 60 can heat the air in the passenger compartment until the air reaches 71° F. using the external power source 14. The VSC/PCM 50 can distribute power from the external power source 14 to the air conditioning system 60 based on the available power level. Thus, the VSC/PCM 50 may control the air conditioning system 60 to increase passenger comfort before the vehicle 12 is driven from one location to another.

As shown in FIG. 1, the system 10 may include a seat heating/cooling system 74 as one of the predetermined components in the vehicle 12. The seat heating/cooling system 74 selectively heats, cools, or selectively heats and cools one or more seats 75 in the vehicle 12. The VSC/PCM 50 can distribute power from the external power source 14 to the seat heating/cooling system 74 based on the available power level. The seat heating/cooling system 74 use high-voltage DC power, low-voltage DC power, AC power, or a combination thereof from the external power source 14, depending on the particular configuration of the seat heating/cooling system 74. Thus, the VSC/PCM 50 may control the seat heating/cooling system 74 through the data bus 54 to increase passenger seat comfort without depleting either the storage battery 32 or the auxiliary battery 36 before the vehicle 12 is driven.

As shown in FIG. 1, the system 10 may include a defroster system 76 as one of the predetermined components in the vehicle 12. The defroster system 76 selectively heats one or more windows 77 in the vehicle 12. For example, the defroster system 76 may heat one of the windows 77 to remove ice or snow that has accumulated on the one window 77. As explained herein, the vehicle 12 may perform this function based on whether the vehicle 12 is parked indoors where the vehicle 12 is protected or outdoors where the vehicle is exposed to the weather. Thus, the defroster system 76 can be used to increase visibility through the windows 77 in the vehicle 12 before the driver drives the vehicle 12 from one location to another.

As shown in FIG. 1, the system 10 may include a steering wheel system 78 as one of the predetermined components in the vehicle 12. The steering wheel system 78 selectively heats or cools a steering wheel 79 in the vehicle 12. For example, the steering wheel 79 may be heated prior to driving the vehicle 12 to enhance drive hand comfort without reducing the SOC of the storage battery 32. The VSC/PCM 50 can distribute power from the external power source 14 to the steering wheel system 78 based on the available power level. Thus, the VSC/PCM 50 may control the steering wheel system 78 through the data bus 54 to increase passenger steering wheel comfort before the vehicle 12 is driven or operated.

As shown in FIG. 1, the battery heating/cooling system 62 is in thermal communication with the storage battery 32 to control a temperature of the storage battery 32. The battery heating/cooling system 62 is shown in the energy storage unit 18. However, the battery heating/cooling system 62 may be positioned outside the energy storage unit 18. The VSC/PCM 50 and/or the BCM 34 can control the battery heating/cooling system 62. In operation, the battery heating/cooling system 62 senses a temperature of the storage battery 32 and, based on a predetermined battery temperature or temperature range that may be stored in memory 52, the battery heating/cooling system 62 either heats or cools the storage battery 32. The battery heating/cooling system 62 can heat or cool the storage battery 32 to increase the charging efficiency of the storage battery 32.

As shown in FIG. 1, the engine coolant system 64 is in thermal communication with the engine 16. The engine coolant system 64 can either cool or selectively heat and cool the engine 16 with an engine "coolant" fluid. For example, the engine coolant system 64 may include an electric coolant pump to circulate the engine "coolant" fluid through the engine 16. The engine coolant system 64 controls the temperature of engine coolant fluid to change or maintain the temperature of the engine 16 within a predetermined temperature range, which can be stored in memory 52. The VSC/PCM 50 and/or the engine control unit 58 can control the engine coolant system 64. For example, the VSC/PCM 50 may control the engine coolant system 64 heating and/or cooling of the engine 16 based on information indicating an ambient temperature around the vehicle 16, a forecasted temperature where the vehicle 16 is located, a vehicle usage pattern, or a combination thereof to improve occupant comfort and fuel economy of the vehicle 12.

Referring again to FIG. 1, the VSC/PCM 50 may prioritize the predetermined components, such as the storage battery 32, the auxiliary battery 36, the air conditioning system 60, the seat heating/cooling system 74, the defroster system 76, the steering wheel system 78, the battery heating/cooling system 62, and the engine coolant system 64, based on different types of information or data that the VSC/PCM 50 stores in memory 52 or receives, such as driver preference information, operation information, battery information, operator usage information, vehicle drive cycle information, environmental information, or a combination thereof. For example, the VSC/PCM 50 may access memory 52 to receive and process a signal embedded or encoded with such information to obtain the information. Based on driver preference information, operation information, battery information, operator usage information, vehicle drive cycle information, environmental information, or a combination thereof, the VSC/PCM 50 may prioritize the predetermined components to obtain the schedule and/or prioritization for distributing the electric power from the external power source 14 to at least one of the predetermined components. For example, the electric power from the external power source 14 may be distributed in an effort to optimize or manage charging of the storage battery 32 as the VSC/PCM 50 controls one or more of the predetermined components in the vehicle 12 prior to driving of the vehicle 12. In such an example, electric power from the external power source 14 may be distributed to the predetermined components to prepare the vehicle 12 prior to driving of the vehicle 12 without reducing the SOC of the storage battery 32.

Driver preference information indicates a programmed user preference for the vehicle 12. A user of the vehicle 12 can store or program the user preference in memory 52 or other suitable computer-readable storage medium in the vehicle 12. For example, the programmed user preference may be, as mentioned above, the programmed user preference for the air conditioning system 60. In addition, the programmed user preference may include a departure time or other information relating to departure. The departure time information may indicate when the user expects to drive the vehicle 12, when the user does not plan to operate the vehicle 12 (e.g., when the user will be on vacation), or when another user plans to use the vehicle 12. For example, the programmed user preference may be departure time having a time, a day, a date, or a combination thereof. For example, the departure time may be 8:00 a.m. on Monday, 9:30 a.m. on Friday, or 6:00 p.m. on Jan. 1, 2015. In such an example, the departure time may indicate when the system 10 should command the air conditioning system 60 to heat or cool the passenger compartment according to the programmed user preference, such as 71° F.

Operation information indicates one or more operation parameters of the vehicle 12. For example, the operation information may include information about how the engine 16, the electric generator 24, the electric motor 26, or other systems in the vehicle 12 are operating. For example, the transaxle control module 56 can provide operation information about the planetary gear set 30, the electric generator 24, and the electric motor 26 while the engine control unit 58 can provide information about the engine 16 and the engine coolant system 64. Operation information may also include information about the energy storage unit 18, the temperature of the engine coolant fluid for the engine 16, temperatures of the seats 75 for the seat heating/cooling system 74, temperatures of the windows 77 for the defroster system 76, and a temperature of the steering wheel 79 for the steering wheel system 78.

Battery information indicates the SOC of the storage battery 32, the auxiliary battery 36, or both. Battery information may also include the temperature of least one of the batteries 32, 36, the charging efficiency of at least one of the batteries 32, 36, power usage from at least one of the batteries 32, 36, as well as operational information of the battery heating/cooling system 62.

Operator usage information indicates how, when, and/or to what extent an operator or driver of the vehicle 12 has previously operated the vehicle 12. More specifically, operator usage information can include past operator use of the predetermined components in the vehicle 12 as well as information about the conditions the predetermined components were operated under. For example, the operator usage information may include information about the operator previously operating the air conditioning system 60, the HVAC 72, the seat heating/cooling system 74, the defroster system 76, the steering wheel system 78, or a combination thereof. In addition, the operator usage information can include information from other systems in the vehicle 12 that the operator has previously used. The VSC/PCM 50 may use the operator usage information to anticipate or learn when the vehicle 12 is likely to require additional power for one of the predetermined components or have extra power to distribute to one or more of the predetermined components in the vehicle 12.

Vehicle drive cycle information indicates historic or past drive cycle information of the vehicle 12. For example, drive cycle information may include average speed of the vehicle 12, time of day information, and emission generation information. For example, emission generation information may include inferred exhaust information based on the different past driving cycles of the vehicle 12. The VSC/PCM 50 may use the vehicle drive cycle information to obtain future vehicle control parameters as well as to anticipate or learn when the vehicle 12 is likely require additional power or have excess power to distribute to one or more of the predetermined components in the vehicle 12.

Environmental information indicates where the vehicle 12 is located, such as whether the vehicle 12 is located indoor or outdoor. A photo sensor or a global positioning system (GPS) can be used to determine whether the vehicle 12 is located indoor or outdoor. Furthermore, environmental information may indicate position information, local time information, and weather information. Satellite-based weather broadcast signals may provide the weather information to the vehicle 12. Various systems in the vehicle 12, such as a vehicle navigation or driver information system, can receive the weather broadcast signals and transmit the environmental information to the VSC/PCM 50. For example, position information may include the GPS coordinates where the vehicle 12 is located or coordinate positioning-based information corresponding to a parked location of the vehicle 12.

Local time information may include current local time of day information, such as 12:30 p.m. Eastern Standard Time (EST) or Eastern Daylight Time (EDT) of the Eastern Time Zone (ET). In addition, local time information may include current local time and date information, such as 12:30 p.m. on Jul. 4, 2009, as well as other time-related information. For example, local time information may include current season information, such as spring, summer, autumn, and winter. The GPS or a clock in the vehicle 12 may provide the local time information.

Weather information can be forecasted weather information or current weather information corresponding to where the vehicle 12 is located. The GPS, Internet, or satellite-radio based systems 73 in the vehicle 12 can provide the forecasted weather information. Weather information may include temperature information, humidity information, visibility information, air quality information, as well as other information indicative of the weather where the vehicle 12 is located. For example, the system 10 may use the environmental information, such as the position information to determine the local time and weather where the vehicle 12 is located, to command the air conditioning system 60 to start heating or cooling the passenger compartment in the vehicle 12 so that the passenger compartment achieves the programmed user preference for temperature (e.g., 71° F.) at programmed user preference departure time (e.g., 9:30 a.m. on Friday). In such an example, if the weather information indicates the vehicle 12 located in very cold weather, then the system 10 may start heating the passenger compartment earlier or at an increased rate than if the weather information had indicated the vehicle 12 was located in warm weather.

Figure 2:
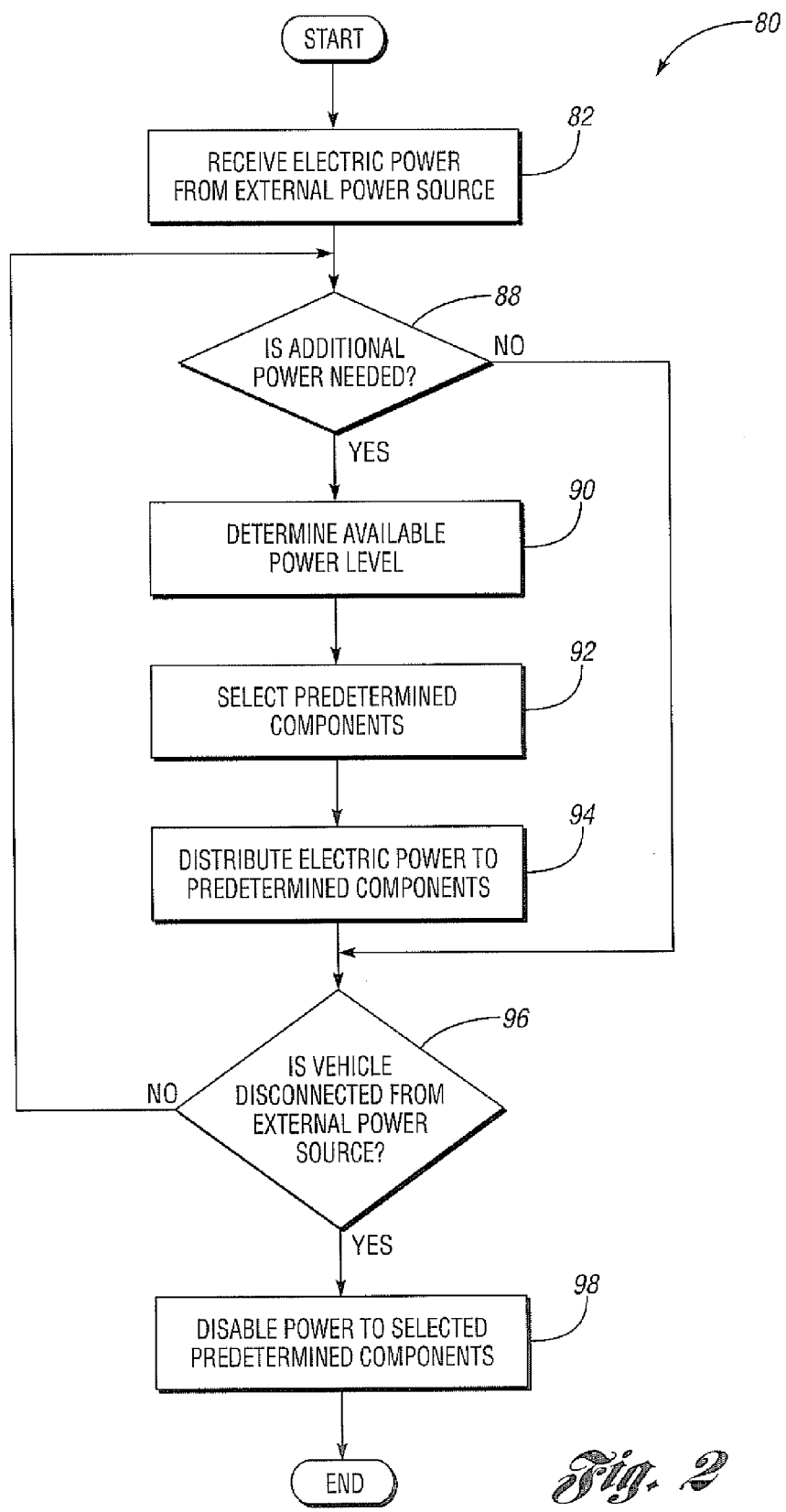
FIG. 2 is a flowchart diagram illustrating a method of controlling electric power from the external power source to the predetermined components in the vehicle.

With reference to FIG. 2, a flowchart diagram 80 illustrating steps of a method of controlling electric power in a plug-in vehicle from an external power source to one or more predetermined components in the vehicle is provided. The vehicle 12 and its components illustrated in FIG. 1 are referenced throughout the discussion of the method to facilitate understanding of various aspects of the present invention. The method of controlling electric power may be implemented through a computer algorithm, machine executable code, or a software program programmed into a suitable programmable logic device(s) of the vehicle 12, such as the VSC/PCM 50, the BCM 34, the power converter 40, or a combination thereof. In addition to the steps shown in FIG. 2, the programmable logic device, such as the VSC/PCM 50, may be programmed with additional steps to provide additional functionality.

At step 82 of the flowchart diagram 80, electric power from the external power source 14 is received. The BCM 34 and the power converter 40 operate under supervisory control of the VSC/PCM 50 to transfer electric power from the external power source 14 to the system 10. The storage battery 32, the auxiliary battery 36, or both may receive the electric power from the external power source 14 at a charging level, such as 1000 watts.

At decision block 88, whether additional power from the external power source 14 is needed to power one or more predetermined components in the vehicle 12 is determined. The VSC/PCM 50 can determine whether additional power from the external power source 14 is needed based on information or data obtained, such as driver preference information, operation information, battery information, operator usage information, vehicle drive cycle information, environmental information, or a combination thereof. If additional power from the external power source 14 is needed, then step 90 occurs. Conversely, if additional power from the external power source 14 is not needed, then decision block 96 occurs.

At step 90, the available power level is determined. The VSC/PCM 50 can determine the available power level based on the charging level of the system 10 and the maximum power level of the external power source 14. Recall, the charging level of the system 10 may represent the charging level of the auxiliary battery 36, the charging level of the high-voltage storage battery 32, or the charging levels of both batteries 32, 36. For example, the VSC/PCM 50 may calculate the available power level as the difference between the maximum power level of the external power source 14 and the charging level of both batteries 32, 36.

At step 92, predetermined components are selected. The VSC/PCM 50 can prioritize and/or schedule each of the predetermined components to determine the predetermined components to be selected. The VSC/PCM 50 can prioritize and schedule each of the predetermined components based on different types of information or data, which may be stored in memory 52. For example, the VSC/PCM 50 may use driver preference information, operation information, battery information, operator usage information, vehicle drive cycle information, environmental information, or a combination thereof to prioritize and schedule each of the predetermined components to obtain a prioritization or schedule. The prioritization or schedule may be stored in memory 52 or any other suitable type of memory in the vehicle 12. For example, the prioritization or schedule may be stored as a list in memory 52. Based on the prioritization and/or schedule, the VSC/PCM 50 can select the predetermined components for receiving the electric power from the external power source 14.

At step 94, the electric power from the external power source 14 is distributed to the predetermined components. The electric power from the external power source 14 may be high-voltage DC power, low-voltage DC power, AC power, or a combination thereof. The VSC/PCM 50 can command the power converter 40 and/or the BCM 34 to distribute the electric power from the external power source 14 to the predetermined components in the vehicle 12. In operation, the VSC/PCM 50 distributes the electric power to the predetermined components selected in step 92 based on the available power level determined in step 90. During step 94, the VSC/PCM 50 may indirectly or directly control the predetermined components to distribute the electric power to the predetermined components.

At decision block 96 of flowchart diagram 80, whether the vehicle 12 is disconnected from the external power source 14 is determined. The power converter 40 and/or the VSC/PCM 50 can determined whether the vehicle 12 is disconnected from the external power source 14. For example, the VSC/PCM 50 may determine whether electrical line 42 electrically connects the vehicle 12 to the external power source 14 to determine whether the vehicle 12 is disconnected from the external power source 14. Alternatively, the VSC/PCM 50 may determine whether the vehicle 12 is disconnected from the external power source 14 based on whether the power converter 40 is converting power from the external power source 14 to a different form of power. If the vehicle 12 is disconnected from the external power source 14, then the vehicle 12 can no longer receive electric power from the external power source 14 and step 98 occurs. However, if the vehicle 12 is not disconnected from the external power source 14, then decision block 88 occurs.

At step 98, power flow to selected predetermined components is disabled. The VSC/PCM 50 or other suitable controller in the system 10 may disable the power flow to the selected predetermined components of step 92.

Electric power from the external power source 14 may be controlled to prepare the vehicle 12 for driver or occupant usage without depleting the storage battery 32, 36 before the vehicle 12 is driven. Preparing the vehicle 12 before the vehicle 12 is driven can reduce startup emissions of the vehicle 12, reduce engine operation in the vehicle 12, improve fuel economy of the vehicle 12, increase passenger comfort, improve charging efficiency of the storage battery 32, 36, improve driving safety, or a combination thereof.

Using the electric power from the external power source 14 to power the predetermined components in the vehicle 12 may be beneficial or preferred to using power generated from the engine 16. One benefit may include operating the components in the vehicle 12 without depleting energy stored in the vehicle 12, such as electric energy stored in the storage battery 32. Another benefit may include operating the components in the vehicle 12 without consuming combustible fuel, such as gasoline, stored in the vehicle 12. Another benefit includes reducing or eliminating carbon monoxide and pollution levels from the engine 16 when the vehicle 12 is stationary and connected to the external power source 14. In addition, using the electric power from the external power source 14 to power one or more components in the vehicle 12 can allow the vehicle 12 to be better prepared for use. Preparing the vehicle 12 prior to use can provide a number of benefits, such as reduced startup emissions of the vehicle 12, increased occupant comfort, improved fuel economy of the vehicle 12, improved charging efficiency of the storage battery 32 in the vehicle 12, and improved safety of the vehicle 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system comprising:
    a high-voltage battery in a vehicle adapted to provide electric power to propel the vehicle and to receive electric power at a first charging level from an external power source having a maximum power level;
    an auxiliary battery adapted to provide low-voltage electric power and to receive electric power at a second charging level from the external power source; and
    a controller in the vehicle configured to distribute the electric power from the external power source to one or more predetermined components in the vehicle based on an available power level based on the difference between the maximum power level and a sum of the first charging level and the second charging level.

2. The system of claim 1 wherein the controller is configured to schedule the predetermined components to receive the electric power from the external power source and to distribute the electric power from the external power source to at least one of the predetermined components.

3. The system of claim 1 wherein the controller is configured to prioritize the predetermined components and to distribute the electric power from the external power source to at least one of the predetermined components.

4. The system of claim 3 wherein the controller is configured to receive a signal having operation information indicating operation parameters of the vehicle, to process the signal to obtain the operation information, and to prioritize the predetermined components based on the operation information.

5. The system of claim 3 wherein the controller is configured to receive a signal having battery information indicating a state of charge of at least one of the high-voltage battery or the auxiliary battery, to process the signal to obtain the battery information, and to prioritize the predetermined components based on the battery information.

6. The system of claim 3 wherein the controller is configured to receive a signal having operator usage and vehicle drive cycle information, to process the signal to obtain the operator usage and vehicle drive cycle information, and to prioritize the predetermined components based on the operator usage and vehicle drive cycle information.

7. The system of claim 3 wherein the controller is configured to receive a signal having driver preference information indicating a programmed user preference for the vehicle, to process the signal to obtain the driver preference information, and to prioritize the predetermined components based on the driver preference information.

8. The system of claim 7 wherein the driver preference information includes departure time information.

9. The system of claim 3 wherein the controller is configured to receive a signal having environmental information indicating where the vehicle is located, to process the signal to obtain the environmental information, and to prioritize the predetermined components based on the environmental information.

10. The system of claim 9 wherein the environmental information includes at least one of position information, local time information, and weather information.

11. The system of claim 9 wherein the environmental information includes forecast forecasted weather information.

12. The system of claim 3 wherein the controller is configured to receive a signal having battery information indicating a temperature of the high-voltage battery and to prioritize heating/cooling of the high-voltage battery based on the battery information.

13. A system for controlling electric power from an external power source to one or more predetermined components in a plug-in vehicle, the external power source being external to the vehicle and having a maximum power level, the system comprising:
a high-voltage storage battery in the plug-in vehicle to receive electric power at a charging level from the external power source;
an auxiliary battery in the plug-in vehicle to receive electric power at another charging level from the external power source; and
a controller in the vehicle configured to calculate an available power level based on a combined charging level of the high-voltage storage battery and the auxiliary battery and the maximum power level, to prioritize the predetermined components based on a programmed user preference, and to distribute the electric power from the external power source to at least one of the predetermined components based on the available power level and the prioritization.

14. A method of controlling power in a vehicle, the method comprising:
receiving electric power from an external power source;
determining calculating an available power level based on a battery charging level derived from a high-voltage battery and an auxiliary battery and a maximum power level of the external power source; and
controlling distributing the electric power to one or more predetermined components in the vehicle based on the available power level.

15. The method of claim 14 further comprising calculating the battery charging level as the sum of a high-voltage battery charging level and an auxiliary battery charging level.

16. The method of claim 14 further comprising prioritizing the predetermined components to receive the electric power from the external power source and controlling the electric power from the external power source to the predetermined components based on the prioritizing.

17. The method of claim 14 wherein the available power level is calculated as a difference between the maximum power level of the external power source and the battery charging level.

18. The method of claim 14 further comprising scheduling the predetermined components to receive the electric power from the external power source wherein the controlling includes distributing the electric power from the external power source to at least one of the predetermined components based on the scheduling.

19. The method of claim 18 wherein the scheduling is determined in real-time.

20. The method of claim 18 wherein the scheduling is predetermined based on a predetermined schedule.

* * * * *

UNITED STATES PATENT AND TRADEMARK OFFICE
CERTIFICATE OF CORRECTION

PATENT NO. : 9,776,519 B2  
APPLICATION NO. : 12/543051  
DATED : October 3, 2017  
INVENTOR(S) : Bala S. Chander et al.

Page 1 of 1

It is certified that error appears in the above-identified patent and that said Letters Patent is hereby corrected as shown below:

Column 13, Line 27, Claim 14:  
Delete "determining".

Column 14, Line 3, Claim 14:  
Delete "controlling".

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*